United States Patent [19]

Toyama et al.

[11] Patent Number: 4,707,381
[45] Date of Patent: Nov. 17, 1987

[54] METHOD FOR FINISH COATING ON POLYURETHANE FORMED ARTICLES

[75] Inventors: Takashi Toyama, Yokohama; Masashi Ohno, Hatano; Kiminori Ishii, Ebina; Shosaku Yamamoto; Kazuo Kakinuma, both of Yokohama, all of Japan

[73] Assignees: Nippon Oil and Fats Co., Ltd., Tokyo; Nissan Motor Co., Ltd., Yokohama, both of Japan

[21] Appl. No.: 866,178

[22] Filed: May 22, 1986

[30] Foreign Application Priority Data

Jun. 3, 1985 [JP] Japan .................. 60-120069

[51] Int. Cl.$^4$ .................................................. B05D 3/02
[52] U.S. Cl. .................. 427/407.1; 427/299; 427/322; 427/307; 427/393.5
[58] Field of Search ........... 427/299, 322, 307, 393.5, 427/407.1

[56] References Cited

U.S. PATENT DOCUMENTS

| | | | |
|---|---|---|---|
| 3,497,468 | 2/1970 | Ulmer | 524/104 |
| 3,639,147 | 2/1972 | Benefiel et al. | 427/393.5 X |
| 3,893,727 | 7/1975 | Desilets | 427/393.5 X |
| 3,962,369 | 6/1976 | Chang et al. | 428/121 X |
| 4,152,313 | 5/1979 | Fogle et al. | 524/104 |
| 4,250,073 | 2/1981 | Tamura et al. | 524/104 |
| 4,315,053 | 2/1982 | Poth et al. | 427/393.5 X |
| 4,529,632 | 7/1985 | Fujii et al. | 427/409 |

FOREIGN PATENT DOCUMENTS

| | | |
|---|---|---|
| 862845 | 3/1961 | United Kingdom . |
| 910997 | 11/1962 | United Kingdom . |
| 1124761 | 8/1968 | United Kingdom . |
| 1136594 | 12/1968 | United Kingdom . |
| 1337941 | 11/1973 | United Kingdom . |
| 1458091 | 12/1976 | United Kingdom . |
| 2150934 | 7/1985 | United Kingdom . |

OTHER PUBLICATIONS

Mar. 1983 Desmolac 4125 RR 2566/1 Brochure.

Primary Examiner—Thurman K. Page
Attorney, Agent, or Firm—Flynn, Thiel, Boutell & Tanis

[57] ABSTRACT

A method for finish coating on polyurethane formed articles, which comprises formulating a finish coating composition so as to have a content of pyrrolidone or its derivative represented by the general formula

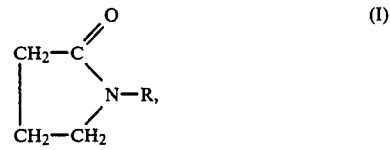

in which R stands for hydrogen or an alkyl group having at the most 4 carbon atoms, in an amount of 5–40% by weight upon the coating, applying this finish coating composition on the polyurethane formed article directly and heating the so called polyurethane formed article at a temperature of at least 50° C. but lower than the thermal deformation temperature of the polyurethane formed article, said method being capable of attaining a coating layer exhibiting both the properties for a primer coat, namely, a better adhesion onto polyurethane formed articles, and for a finish coat, namely, better weather resistance, higher chemical resistance, favorable appearance and so on, with only a single application and permitting thus to dispense with the primer coating and the heat drying procedure therefor.

8 Claims, No Drawings

METHOD FOR FINISH COATING ON POLYURETHANE FORMED ARTICLES

BACKGROUND OF THE INVENTION

1. Field of the Invention

The present invention relates to a method for finish coating on polyurethane formed articles.

2. Description of the Prior Art

Polyurethane formed articles have found wide applications in various fields, in particular for parts of automobiles owing to their features of excellence in the moldability, resiliency, toughness and so on. In coating polyurethane formed articles with coating compositions for decorative purpose, a special primer coating assigned exclusively for polyurethane resin has been employed, since the adhesion of usual finish coatings onto polyurethane substrates is in general insufficient. Thus, in the conventional technique for coating polyurethane formed articles, a twice-baking method is incorporated in such a manner that the polyurethane formed article is pretreated by vapor degreasing with an organic solvent, such as, 1,1,1-trichloroethane or 1,1,2-trichlorotrifluoroethane, or by alkali-degreasing and the so pretreated article is subjected to a primer coating, followed then by heat drying, whereupon a finish coating is applied with subsequent another heat drying.

As the primer coating for polyurethane resin formed articles, there has heretofore been employed a specific primer coating composition exclusive for polyurethane resin which reveals superior adhesion onto the polyurethane substrate, such as for example, an undercoat composition for an elastomer skin coating based on a reaction product of a polycarboxylic acid or its anhydride with a hydroxyl-containing urethane reaction product (U.S. Pat. No. 3,962,369 and the corresponding Brit. Pat. No. 1,458,091 and Japanese Patent Publication No. 36285/1976) or a primer coating composition using an aliphatic linear polyurethane and N-methyl-pyrrolidone (Catalogue RR 2566/1 of the firm Bayer). After the application of such a primer coating composition, a heat drying is by all means required before the application of the skim coating, in order to avoid any defective influence upon the skin coating.

As to the skin coating composition for application on polyurethane formed articles, there have been found in the practical use, for instance, skin coating compositions containing, as the essential resin component, a polyester resin or an acrylic resin together with an aminoplast or an isocyanate.

The conventional technique for coating polyurethane resin formed articles requires each separate procedure for the primer coating and skin coating with two heat drying procedures and, thus, two coating compositions are necessary with corresponding complicated procedures and installations, neccesitating longer coating time and higher coating costs.

Though the primer coating exhibits in itself better adhesion onto the polyurethane substrate, it is inferior in the weather resistance, chemical resistance, appearance and so on. The skin coating is superior in itself in the weather resistance and chemical resistance, but is inferior in the adhesion onto the polyurethane substrate. Thus, there was a practical demand for a single coating composition which reveals not only a better adhesion onto the polyurethane substrate comparable to the primer coating of the prior art but also excellent in the weather resistance, chemical resistance, appearance and so on comparable to the skin coating of the prior art.

BRIEF SUMMARY OF THE INVENTION

An object of the present invention is to provide a method for attaining finish coating of polyurethane resin formed articles which satisfies the above demand.

Another object of the present invention is to provide a method for finish coating on polyurethane formed articles by formulating a finish coating composition so as to have a content of pyrrolidone or its derivative in a definite amount and coating the polyurethane formed article directly with this finish coating composition, followed by a heat drying at a temperature above 50° C.

A still another object of the present invention is to provide a method for finish coating on polyurethane formed articles which makes it possible to dispense with the primer coating and the heat drying procedure therefor.

A further object of the present invention is to provide a method for finish coating on polyurethane formed articles which makes it possible to attain a coating layer exhibiting both the properties for a primer coat, namely, a better adhesion onto polyurethane formed article, and for a finish coat, namely, better weather resistance, higher chemical resistance, favorable appearance and so on, with only a single application.

In summary, the present invention provides a method for finish coating on polyurethane formed articles, which comprises formulating a finish coating composition so as to have a content of pyrrolidone or its derivative represented by the general formula

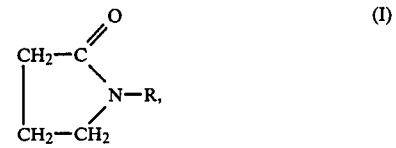

in which R stands for hydrogen or an alkyl group having at the most 4 carbon atoms, in an amount of 5–40% by weight upon the coating, applying this finish coating composition on the polyurethane formed article directly and heating the so coated polyurethane formed article at a temperature of at least 50° C. but lower than the thermal deformation temperature of the polyurethane formed article.

DETAILED DESCRIPTION OF THE INVENTION

The polyurethane resin formed articles to be coated by the method according to the present invention are those which have found their wide application in, for example, automobile parts and so on, consisting essentially of a polyurethane resin containing, if necessary, additives, for example, color pigments, such as, carbon black, titanium dioxide and so on; extenders, such as, calcium carbonate, talc and so on; reinforcing substances, such as, glass fiber, carbon fiber and so on; and modifying agents, such as, UV-absorber, antioxidant, fire retardant, foaming agent and so on.

The pyrrolidone and its derivatives to be employed in the method according to the present invention are represented by the general formula (I), examples of which include b 2-pyrrolidone, N-methyl-2-pyrrolidone, N-ethyl-2-pyrrolidone, N-propyl-2pyrrolidone, N-butyl-2-pyrrolidone and so on, which can be employed solely or in mixture of two or more of them. Pyrrolidone derivatives expressed by the general formula (I) in which the alkyl group R contains 5 or more carbon atoms exhibit lower effect for swelling the surface of the polyurethane substrate requisite for achieving better adhesion and, thus, provide no sufficient adhesion.

The pyrrolidone or its derivative described above is allowed to exist in the finish coating composition according to the present invention in an amount of 5-40%, based on the weight of the coating composition. When a commercially available finish coating paint is used for the formulation of coating composition according to the present invention, the pyrrolidone or its derivative is introduced therein as a dilution solvent (thinner) to complete the composition.

If the amount of pyrrolidone or its derivative in the finish coating composition is short of 5% by weight upon application thereof, the adhesion onto the polyurethane resin substrate will be inferior due to insufficient swelling of the surface layer of the polyurethane substrate. If, on the other hand, the amount exceeds the value of 40% by weight, an excessive flow and drooping occurs upon application, so that a homogeneous coating layer will not be obtained.

As the starting finish coating paint to be used for formulation of the coating composition according to the present invention, those which are used for external decorative coatings superior in weather resistance, chemical resistance, aesthetic appearance and so on and capable of dissolving in pyrrolidone or pyrrolidone derivatives may be employed. It is possible to use a commercially available or a known finish coating paint therefor, while it is also possible to employ a finish coating composition which has not found its practical use for coating polyurethane resin formed articles. These starting finish coating paints may or may not contain pyrrolidone or its derivative. If the starting finish coating paint contains no or only a small amount of pyrrolidone or its derivative, it is able to adjust the content of pyrrolidone or its derivative within the range indicated above by admixing it to the starting paint.

The starting finish coating paint to be used for formulating the finish coating composition according to the present invention may be a known synthetic resin paint, such as for example, (1) a one-liquid thermosetting paint based on a polyester resin or a acrylic resin with a cross linking component of an aliphatic or cycloaliphatic isocyanate blocked by, such as, methyl ethyl ketoxime, acetylacetone, phenol or isopropylalcohol, or an aminoplast, (2) a two-liquid urethane paint based on a polyester resin or an acrylic resin with a cross linking component of an aliphatic or cycloaliphatic isocyanate or (3) a lacquer paint based on, such as, an acrylic resin, nitrocellulose or cellulose acetate butyrate.

The content of the resin component in the finish coating composition according to the present invention upon application may preferably be in the range from 3 to 95% by weight as solid matter, in particular, from 10 to 70% by weight. If this content is less than 3% by weight, disadvantageous behavior upon application, such as, excessive flow and drooping, may occur, and, when the amount exceeds 95% by weight, a favourable adhesion onto polyurethane substrate will not be obtained, since the content of pyrrolidone or its derivative becomes lower than 5% by weight.

The finish coating composition to be used in the method according to the present invention may contain, if necessary, pigments, solvents other than the pyrrolidone or its derivative and various additives, in addition to the resin component and pyrrolidone or its derivative.

As the pigment, those which have found their practical application in conventional finish paints may be used, for example, inorganic color pigments, such as, titanium dioxide, carbon black, iron oxide and so on; organic color pigments, such as, Phthalocyanine Blue, Quinacridone Red and so on; extenders, such as, barium sulfate, calcium carbonate, synthetic silica and so on; metal powder of, such as, aluminum and so on; and electric conductive pigments, such as, electroconductive carbon black and so on, which may be used solely or in a mixture of two or more of them.

The content of the pigment in the finish coating composition upon the application may suitably be in the range from 0 to 3, in particular, from 0 to 2.5, in terms of the ratio of pigment/resin component (solids). If the pigment content exceeds the value of 3 in this ratio, weather resistance (rate of retention of luster after the weather resistance test) will be decreased.

As the solvent other than pyrrolidone or its derivative permitted to be incorporated in the finish coating composition according to the present invention, for example, toluene, xylene, isopropyl alcohol, n-butyl alcohol, butyl acetate, methyl ethyl ketone, ethylene glycol monoethyl ether acetate and water are enumerated, which may be used alone or in combination of two or more of them.

The amount of the above mentioned solvent other than pyrrolidone or its derivative in the finish coating composition of the present invention upon the application may be in the range from 0 to 92% by weight, preferably from 5 to 70% by weight. If the amount of the solvent other than pyrrolidone or its derivative exceeds 92% by weight, the concentration of pyrrolidone or its derivative and of the resin component becomes too low and a coating layer exhibiting better adhesion will not be obtained.

As the additive to be incorporated in the finish coating composition according to the present invention, there may be enumerated, for example, surfactants of silicone and non-silicone bases, a reaction regulating agent, such as, acids and amines, UV-absorbing agent, antioxidant, light-stabilizer, precipitation retarder, antistatic agent, wax based on acrylate or amide and so on, which may be incorporated solely or in a form of mixture of two or more of them.

For preparing the finish coating composition to be employed in the method according to the present invention, conventional techniques for preparing finish coating paints may be used. Thus, the pigment and a part of the resin solution and, if necessary, a further solvent are mixed together and the mixture is homogenized on a dispersing apparatus, such as, sand grinding mill, ball mill, super mill, attritor or roll mill, to a requisite particle distribution, and thereto are added then the rest of the resin solution, pyrrolidone or its derivative, solvent other than pyrrolidone or its derivative and additives, whereupon the mixture is agitated homogeneously to obtain a finish coating composition capable of applying directly onto polyurethane formed articles. When employing a commercially available starting finish coating paint, the commercial finish coating paint is mixed with pyrrolidone or its derivative and, if necessary, with other solvent as the thinner and the mixture is agitated homogeneously, whereby a finish coating composition capable of applying directly onto polyurethane formed articles is obtained.

In practicing the method of finish coating according to the present invention, the polyurethane formed article to be coated is first treated by a known degreasing technique using an organic solvent, such as, 1,1,1-trichloroethane or 1,1,2-trichlorotrifluoroethane, by vapor degreasing and/or alkali degreasing and the so treated article is coated then directly with the above described finish coating composition using an air-atomization coating machine, an electrostatic air-atomization coating machine or so on, followed by hardening or curing of the coated layer by heating it to a temperature of 50° C. or higher but lower than the thermal deformation temperature of the polyurethane formed article.

The reason why the coated polyurethane formed article is heated to a temperature of at least 50° C. but lower than the thermal deformation temperature of the polyurethane formed article is as follows:

In order to attain adhesive bonding between the coated layer and the polyurethane resin substrate, it is necessary that the hardening or curing of the coating film and the swelling of the surface layer of the polyurethane formed article by pyrrolidone or its derivative are effected concurrently. If the temperature of the polyurethane formed article is not higher than 50° C., the swelling of the surface layer of the polyurethane formed article by pyrrolidone or its derivative is insufficient and the adhesion becomes inferior. If, on the other hand, the temperature of the polyurethane formed article exceeds the thermal deformation temperature, the polyurethane formed article undergoes a thermal deformation, though the adhesion may be superior, resulting in a problematic final product.

While the method according to the present invention allows to coat only with a single coating composition, it is also possible to incorporate two or more finish coating compositions with two or more application procedures, wherein it is unnecessary, however, to apply a primer coating and it is permissible to incorporate the heat drying only once.

For the coating system for the above finish coating composition, there may be enumerated, for example, one-coat/one-bake solid color, one-coat/one-bake metallic color, two-coat/one-bake solid color and two-coat/one-bake metallic color etc. Here, it is meant by the two-coat/one-bake solid color one of the coating systems for finish coating, wherein a base coating with high pigment content is first applied and thereon is then applied a top-coat which is a transparent clear lacquer or a colored clear lacquer having scarce pigment content, whereupon both the coating layers are baked at a time. The two-coat/one-bake metallic color is one of coating systems for finish coating, in which a base coat containing aluminum powder is first applied and thereon is then superposed a top-coat of transparent clear lacquer or a colored clear lacquer having scarce pigment content, whereupon the so laminated coating layers are baked at a time. Both in the two-coat/one-bake solid color and two-coat/one-bake metallic color, the principal resin component consists of acrylic resin and/or polyester resin with an aminoplast or an isocyanate compound.

In the coating system of the two-coat/one-bake type, the adhesion onto the polyurethane formed article can be obtained in so far as the pyrrolidone or its derivative is contained in the base coat, so that it is unnecessary to include pyrrolidone or its derivative in the top-coat.

It is assumed that the better adhesion achieved by the method according to the present invention may be due to the fact that the surface layer of polyurethane formed article is wetted and swelled by pyrrolidone or its derivative, when the finish coating composition containing pyrrolidone or its derivative is applied on the polyurethane formed article and an efficient swelling of the surface layer of polyurethane formed article is attained concurrently with the curing or drying of the coated layer by incorporating a heating, whereby an interlocking of the surface molecules of the polyurethane resin with the molecules of the coating layer will be realized.

By the method according to the present invention, the finish coating composition is allowed to contain pyrrolidone or its derivative in a definite amount and is applied directly onto a polyurethane formed article, whereupon the coated product is heated to a definite temperature, so that it is made possible to dispense with the application of a primer coating as in the conventional technique and to obtain a coating layer exhibiting superior adhesion onto polyurethane formed articles comparable to the primer coating of the conventional technique together with excellent properties for a finish coating, such as, weather resistance, chemical resistance, aesthetic appearance and so on, with only a single heat drying procedure. Therefore, it offers remarkable advantages in simplifying the coating composition, coating procedures and the coating apparatus etc., in multiplying the productivity and in economizing the coating costs at a considerable degree.

DESCRIPTION OF PREFERRED EXAMPLE OF THE INVENTION

In the following, the present invention will further be described in detail by way of Examples and Comparison Examples, in which the denotetion of % refers to that on weight basis.

Examples 1 to 30 and Comparison Examples 1 to 8

A plate of polyurethane resin (of the firm Sumitomo Beyer Urethane K.K.) having a size of 3 mm×100 mm×200 mm was treated in a vapor of 1,1,1-trichloroethane for 60 seconds and the plate was then coated with a finish coating composition prepared by diluting a commercially available starting paint with pyrrolidone or its derivative to a coating viscosity, by air-atomization coating. By heat drying the so coated plate, each test specimen was obtained.

In Table I, the commercially available starting paint for formulating the finish coating composition according to the present invention (indicated with star mark *) and the composition of the formulated coating mixture as well as the test results for the coating layer are recited for each of the Examples and Comparison Examples. Table I includes also data for the fundamental resin system, for the N-substituent group R of the pyrrolidone or its derivative, for the coating viscosity, for the heat drying condition and for the thickness of the heat dried coating layer.

The test for the coating layer includes determinations of adhesion, acid-resistance, fastness against gasoline and resistance to weathering.

Below, concrete procedures for the each testing experiment are given.

Adhesion:

The evaluation was performed in such a manner, that each 11 cut lines each cut to a depth reaching to the substrate resin are made on the coated surface of the specimen both in the longitudinal and in the lateral directions each at an interval of 1 mm so as to leave therebetween 100 cut squares and thereon is then stucked a sheet of adhesive cellophane tape tightly and the stuck-on cellophane tape is peeled off all at once. The number of squares remaining on the specimen after the peeling is used as the evaluation measure, in which the evaluation class "excellent" with mark O refers to the number of remaining squares of 100, the evaluation class "superior" with mark Δ refers to the number of remaining squares in the range from 99 to 80, the evaluation class "inferior" with mark X refers to the number of remaining squares in the range from 79 to 50 and the evaluation class "quite inferior" with mark XX refers to the number of remaining squares in the range from 49 to 0.

Acid-resistance:

The evaluation was performed in such a manner, that 0.2 ml of a 5% aqueous solution of sulfuric acid is placed on the coated surface of the specimen and the specimen is held in horizontal position for 4 hours at a temperature of 20° C. and it is then washed with water and inspected for any change in the color, occurrence of speck and swelling and so on. The evaluation is made by the classification into "no change" with mark O, "scarce change" with mark Δ and "marked change" with mark X.

Fastness against gasoline:

The evaluation was performed in such manner, that the specimen is immersed in gasoline for 1 hour and is then inspected for any change in the color of coating and occurrence of speck, swelling and exfoliation. The evaluation is made by the classification into "no change" with mark O, "scarce change" with mark Δ and "marked change" with mark X.

Weather resistance:

The evaluation was performed in such a manner, that the specimen is subjected to a weathering in Sunshine-Weatherometer for 1,000 hours and the luster value of the non-polish portion is compared with the original luster value to determine the luster retention rate. The evaluation is made by the classification into those with marks O, Δ and X representing the retention rate of 100–70%, 70–40% and 40–0% respectively.

In Table I, the %-values for the content of aluminum paste given in the parentheses in the item of Composition of Coating Mixture refer to the percent content of solid matter. The pigments employed were:

| | |
|---|---|
| Titanium dioxide | JR-602 (trade name) of the firm Teikoku Kako K.K. |
| Carbon black | Laben 450 (trade name) of the firm Columbia Carbon Japan K.K. |
| Electroconductive carbonblack | Conductex 950 (trade name) of the firm Columbia Carbon Japan K.K. |
| Phthalocyanine Blue | Cyanine Blue-MG-7 (trade name) of the firm Toyo Ink Manufacturing Co., Ltd. |
| Synthetic silica | Siloid 308 (trade name) of the firm Fuji Davidson Kagaku K.K. |
| Aluminum paste | Alpaste 1700 N (trade name; solids content 65%) of the firm Toyo Aluminum K.K. |
| Surface conditioner | KP-340 (trade name; a surface conditioner based on silicone) of the firm The Shin-etsu Chemical Industry Co., Ltd. |

As is seen from the results given in Table I, the Examples 1 to 30 according to the invention have revealed that all the performances in the tests were satisfactory.

Comparison Example 1 refers to the case in which the N-substituent group R stands for n-pentyl and showed that the results for the adhesion and fastness to gasoline were inferior. Comparison Examples 2 and 4 refer to the cases in which pyrrolidone or its derivative is contained in a too low amount (Comparison Example 2) and in which no pyrrolidone or its derivative is contained (Comparison Example 4), wherein it was shown that the results for the adhesion and fastness to gasoline were inferior. Comparison Example 3 represents the case in which a phenomenon of "flow" was brought about upon coating due to an excessive content of pyrrolidone. Since no satisfactory coating layer was obtained here, the tests for the coating layer were omitted. Comparison Examples 5 to 7 correspond to the case in which the drying temperature was lower than the prescribed limit and it was shown that the results for the adhesion and fastness to gasoline were inferior. Comparison Example 8 corresponds to the case in which the starting paint was one of conventional primer coating paints for plastic resins and it was shown that the results for the acid-resistance, fastness to gasoline and weather resistance were inferior.

TABLE I

| Items | | No. 1 | No. 2 | No. 3 | No. 4 | No. 5 | No. 6 | No. 7 |
|---|---|---|---|---|---|---|---|---|
| Starting Paint | Paint System | Soft; 1 coat/1 bake solid color; (PLAGLOSS No. 3000 Electroconductive Black)* | Soft; 1 coat/1 bake solid color; (PLAGLOSS No. 3000 Matted Black)* | Soft; 1 coat/1 bake solid color; (PLAGLOSS No. 3000 Black)* | Soft; 1 coat/1 bake solid color; (PLAGLOSS No. 3000 Black)* | Soft; 1 coat/1 bake solid color; (PLAGLOSS No. 3000 Black)* | Soft; 1 coat/1 bake solid color; (PLAGLOSS No. 3000 Black)* | Soft; 1 coat/1 bake solid color; (PLAGLOSS No. 3000 Black)* |
| | Principal Resin System | Soft acrylic resin/melamine resin | Soft acrylic resin/melamine resin | Soft acrylic resin/melamine resin | Soft acrylic resin/melamine resin | Soft acrylic resin/melamine resin | Soft acrylic resin/melamine resin | Soft acrylic resin/melamine resin |
| N—Substituent Group R | | Hydrogen | Methyl | Ethyl | n-Propyl | n-Butyl | Methyl | Methyl |
| Formulated Finish Coating Composition (%) | Resin Component (solid matter) | 30 | 30 | 30 | 30 | 30 | 30 | 30 |
| Pigment: | Titanium dioxide | — | — | — | — | — | — | — |
| | Carbon black | 1 | 1 | 1 | 1 | 1 | 1 | 1 |
| | Electroconductive carbon black | — | — | — | — | — | — | — |
| | Phthalocyanine Blue | — | — | — | — | — | — | — |
| | Synthetic silica | — | — | — | — | — | — | — |
| | Aluminum paste | — | — | — | — | — | — | — |
| Solvent: | Pyrrolidone or its derivative | 20 | 20 | 20 | 20 | 20 | 40 | 5 |
| | Xylene | 20 | 20 | 20 | 20 | 20 | 10 | 20 |
| | Butyl acetate | 8 | 8 | 8 | 8 | 8 | 8 | 8 |
| | n-Butyl alcohol | 20 | 20 | 20 | 20 | 20 | — | 30 |
| | EGMEA(1) | — | — | — | — | — | 10 | 5 |
| | Methyl ethyl ketone | — | — | — | — | — | — | — |
| | Deionized water | — | — | — | — | — | — | — |
| | Surface conditioner | 1 | 1 | 1 | 1 | 1 | 1 | 1 |
| Coating Viscosity (Ford Cup No. 4, 20° C.) | | 20 sec. | 20 sec. | 20 sec. | 20 sec. | 20 sec. | 20 sec. | 20 sec. |
| Heat Drying Condition | | 120° C., 30 min. | 120° C., 30 min. | 120° C., 30 min. | 120° C., 30 min. | 120° C., 30 min. | 120° C., 30 min. | 120° C., 30 min. |
| Thickness of dried Coating Layer (μ) | | 36 | 37 | 39 | 38 | 37 | 36 | 38 |
| Result of Coating Layer Test | Adhesion | ○ | ○ | ○ | ○ | ○ | ○ | ○ |
| | Acid-resistance | ○ | ○ | ○ | ○ | ○ | ○ | ○ |
| | Fastness against gasoline | ○ | ○ | ○ | ○ | ○ | ○ | ○ |
| | Weather resistance | Better | Better | Better | Better | Better | Better | Better |
| Over-all appraisal | | | | | | | | |
| Ratio of pigment/resin component (solid matter) | | 0.03 | 0.03 | 0.03 | 0.03 | 0.03 | 0.03 | 0.03 |

| Items | | No. 8 | No. 9 | No. 10 | No. 11 | No. 12 | No. 13 | No. 14 |
|---|---|---|---|---|---|---|---|---|
| Starting Paint | Paint System | Soft; 1 coat/1 bake solid color; (PLAGLOSS No. 3000 Electroconductive Black)* | Soft; 1 coat/1 bake solid color; (PLAGLOSS No. 3000 Matted Black)* | Soft; 1 coat/1 bake metallic color; (PLAGLOSS No. 5000 Silver MJ)* | Soft; 2 coat/1 bake metallic color; (PLAGLOSS No. 5500 Silver MJ)* | Soft; 2 coat/1 bake solid color; (PLAGLOSS No. 5500 Blue)* | Soft; 2 coat/1 bake metallic color; (PLAGLOSS No. 6500 Silver M)* | Soft; 1 coat/1 bake solid color; (PLAGLOSS No. 3000 B White)* |
| | Principal Resin System | Soft acrylic resin/melamine resin | Soft acrylic resin/melamine resin | Soft acrylic resin/melamine resin | B.C.(2) /melamine resin  T.C.(3) /melamine resin | B.C.(2) Soft AC/M(4)  T.C.(3) Soft AC/M(4) | B.C.(2) Soft AC/M(4)  T.C.(3) Soft AC/Al(5) | Soft PEs/bIC(6) |
| N—Substituent Group R | | Methyl | Methyl | Methyl | Methyl | Methyl | Methyl | Methyl |

TABLE I-continued

| Items | | | | | | | | | | | |
|---|---|---|---|---|---|---|---|---|---|---|---|
| lated Finish | Resin Component (solid matter) | 30 | 25 | 25 | 22 | 35 | 21 | 35 | 20 | 36 | 28 |
| Coating Composition | Pigment: | | | | | | | | | | |
| | Titanium dioxide | — | 1 | — | — | — | — | — | — | — | — |
| | Carbon black | 3 | — | — | — | — | — | — | — | — | 22 |
| | Electroconductive carbon black | — | — | — | — | — | — | — | — | — | — |
| | Phthalocyanine Blue | — | 5 | — | — | — | 4 | — | — | — | — |
| | Synthetic silica | — | — | — | — | — | — | — | — | — | — |
| | Aluminum paste | — | — | 3 (0.19) | 6 (3.9) | — | — | — | 4 (2.6) | — | — |
| | Solvent: | | | | | | | | | | |
| | Pyrrolidone or its derivative | 20 | 20 | 25 | 25 | — | 20 | — | 25 | — | 15 |
| | Xylene | 20 | 10 | 10 | 6 | 40 | 20 | 40 | 10 | 45 | 10 |
| | Butyl acetate | — | — | 10 | 15 | 10 | 10 | 10 | 20 | 8 | — |
| | n-Butyl alcohol | 10 | 8 | 10 | 10 | 14 | 24 | 14 | — | 10 | 10 |
| | EGMEA(1) | 15 | 20 | — | — | — | — | — | 20 | — | 14 |
| | Methyl ethyl ketone | — | — | 16 | 20 | — | — | — | — | — | — |
| | Deionized water | — | — | — | — | — | — | — | — | — | — |
| | Surface conditioner | 1 | 1 | 1 | 1 | 1 | 1 | 1 | 1 | 1 | 1 |
| Coating Viscosity (Ford Cup No. 4, 20° C.) | | 20 sec. | 20 sec. | 14 sec. | 13.5 sec. | 20 sec. | 14 sec. | 20 sec. | 13 sec. | 17 sec. | 18 sec. |
| Heat Drying Condition | | 120° C., 30 min. | 120° C., 30 min. | 120° C., 30 min. | 120° C., 30 min. | 120° C., 30 min. | 120° C., 30 min. | 120° C., 30 min. | 120° C., 30 min. | 120° C., 30 min. | 120° C., 30 min. |
| Thickness of dried Coating Layer (μ) | | 38 | 34 | 37 | 18 | 31 | 22 | 29 | 18 | 32 | 36 |
| Result of Coating Layer Test | Adhesion | O | O | O | O | O | O | O | O | O | O |
| | Acid-resistance | O | O | O | O | O | O | O | O | O | O |
| | Fastness against gasoline | O | O | O | O | O | O | O | O | O | O |
| | Weather resistance | Better | Better | Better | Better | Better | Better | Better | Better | Better | Better |
| Ratio of pigment/resin component (solid matter) | | 0.01 | 0.24 | 0.08 | 0.18 | 0 | 0.19 | 0 | 0.13 | 0 | 0.79 |

| Items | No. 15 | No. 16 | No. 17 | Example No. 18 | No. 19 | No. 20 | No. 21 |
|---|---|---|---|---|---|---|---|
| Starting Paint | Hard; 1 coat/ 1 bake solid color; (MELAMI No. 1 Black)* | Hard; 2 coat/ 1 bake metallic color; (BELCOAT No. 5700 Silver M)* | Hard; 2 coat/ 1 bake solid color; (BELCOAT No. 5200 Black)* | Soft; 1 coat/ 1 bake solid color; (PLAGLOSS No. 4000 White)* | Soft; 1 coat/ 1 bake solid color; (PLAGLOSS No. 4000 White)* | Soft; 1 coat/ 1 bake solid color; (PLAGLOSS No. 4000 White)* | Soft; 1 coat/ 1 bake solid color; (PLAGLOSS No. 4000 White)* |
| Principal Resin System | Hard Polyester resin/melamine resin | B.C.(2) Hard AC/M(4) | T.C.(3) Hard AC/M(4) | B.C.(2) Hard AC/M(4) | T.C.(3) Hard AC/M(4) | Soft PEs/Al(7) | Soft PEs/Al(7) | Soft PEs/Al(7) | Soft PEs/Al(7) |
| N—Substituent Group R | Methyl | Methyl | Methyl | Methyl | Methyl | Methyl | Methyl |
| Formulated Finish Coating Composition | Resin Component (solid matter) | 34 | 24 | 23 | 34 | 30 | 30 | 30 | 30 |
| | Pigment: | | | | | | | |
| | Titanium dioxide | 1 | — | 1 | 24 | 24 | 24 | 24 |
| | Carbon black | — | — | — | — | — | — | — |
| | Electroconductive carbon black | — | — | — | — | — | — | — |
| | Phthalocyanine Blue | — | — | — | — | — | — | — |
| | Synthetic silica | — | — | — | — | — | — | — |
| | Aluminum paste | — | 6 (3.9) | — | — | — | — | — |
| | Solvent: | | | | | | | |
| | Pyrrolidone or its derivative | 30 | 25 | 30 | 40 | 5 | 20 | 20 |
| | Xylene | 20 | — | — | — | 10 | 5 | 5 |
| | Butyl acetate | — | 20 | 20 | — | — | — | — |

4,707,381

TABLE I-continued

| Items | No. 22 | No. 23 | | No. 24 | No. 25 | No. 26 | No. 27 | No. 28 |
|---|---|---|---|---|---|---|---|---|
| Start-ing Paint | Soft; 1 coat/1 bake metallic color; (PLAGLOSS No. 6000 Silver M)* | Soft; 2 coat/1 bake metallic color; (PLAGLOSS No. 8000 Silver M)* | | Hard; 1 coat/1 bake solid color; (HI-URETHAN No. 2000 White)* | Hard; 1 coat/1 bake solid color; (HIURETHAN No. 5000 White)* | Water-soluble; 1 coat/1 bake solid color; (AQUA No. 9000 White)* | Lacquer; 1 coat/1 bake solid color; (ACRITE No. 500 White)* | Lacquer; 1 coat/1 bake solid color; (PLAGLOSS No. 7000 White)* |
| | | B.C.(2) | T.C.(3) | | | | | |
| Principal Resin System | Soft AC/AI(5) | Soft AC/AI(5) | Soft AC/AI(5) | Hard PEs/CAI(8) | Hard AC/CAI(9) | Water-soluble PEs/M(10) | Acryl. resin/nitrocellul. | Polyester r./nitrocellul. |
| N—Substituent Group R | Methyl | Methyl | — | Methyl | Methyl | Methyl | Methyl | Methyl |
| Formu-lated Finish Coat-ing Compo-sition | | | | | | | | |
| Resin Component (solid matter) Composition (%) | 26 | 21 | 37 | 30 | 28 | 30 | 10 | 24 |
| Pigment: | | | | | | | | |
| Titanium dioxide | — | — | — | 25 | 22 | 24 | 10 | 20 |
| Carbon black | — | 2 | — | — | — | — | — | — |
| Electroconductive carbon black | 2 | — | — | — | — | — | — | — |
| Phthalocyanine Blue | — | — | — | — | — | — | — | — |
| Synthetic silica | — | — | — | — | — | — | — | — |
| Aluminum paste | 4 (2.6) | 6 (3.9) | — | — | — | — | — | — |
| Solvent: | | | | | | | | |
| Pyrrolidone or its derivative | 20 | 15 | — | 20 | 30 | 15 | 10 | 20 |
| Xylene | 20 | 15 | 30 | 12 | 10 | — | 20 | 10 |
| Butyl acetate | 10 | 20 | 12 | — | — | — | 8 | — |
| n-Butyl alcohol | — | — | 20 | 10 | 9 | — | — | — |
| EGMEA(1) | 17 | 20 | — | — | — | — | 21 | 11 |
| Methyl ethyl ketone | — | — | — | — | — | — | 20 | 14 |
| Deionized water | — | — | — | — | — | 30 | — | — |
| Surface conditioner | 1 | 1 | 1 | 1 | 1 | 1 | 1 | 1 |
| Coating Viscosity (Ford Cup No. 4, 20° C.) | 15 sec. | 13 sec. | 17 sec. | 18 sec. | 18 sec. | 25 sec. | 16 sec. | 16 sec. |
| Heat Drying Condition | 80° C., 30 min. | 80° C., 30 min. | | 80° C., 30 min. | 80° C., 30 min. | 160° C., 30 min. | 50° C., 60 min. | 50° C., 60 min. |
| Thickness of dried Coating Layer (μ) | 36 | 18 | 29 | 34 | 36 | 38 | 33 | 36 |
| Result of Coating Layer Test | | | | | | | | |
| Adhesion | ○ | ○ | | ○ | ○ | ○ | ○ | ○ |
| Acid-resistance | ○ | ○ | | ○ | ○ | ○ | ○ | ○ |
| Fastness against gasoline | ○ | ○ | | ○ | ○ | ○ | ○ | ○ |
| Weather resistance | Better | Better | | Better | Better | Better | Better | Better |

| Items | No. 22 | No. 23 | No. 24 | No. 25 | No. 26 | No. 27 | No. 28 |
|---|---|---|---|---|---|---|---|
| n-Butyl alcohol | 8 | 9 | 10 | — | — | 10 | 10 |
| EGMEA(1) | 7 | — | — | 5 | 20 | 10 | 10 |
| Methyl ethyl ketone | — | 15 | 15 | — | 10 | — | — |
| Deionized water | — | — | — | — | — | — | — |
| Surface conditioner | 1 | 1 | 1 | 1 | 1 | 1 | 1 |
| Coating Viscosity (Ford Cup No. 4, 20° C.) | 25 sec. | 14 sec. | 14 sec. | 18 sec. | 18 sec. | 18 sec. | 18 sec. |
| Heat Drying Condition | 140° C., 30 min. | 140° C., 30 min. | 140° C., 30 min. | 80° C., 30 min. | 80° C., 30 min. | 80° C., 30 min. | 50° C., 3 hr. |
| Thickness of dried Coating Layer (μ) | 34 | 21 | 19 | 38 | 36 | 37 | 39 |
| Result of Coating Layer Test | | | | | | | |
| Adhesion | ○ | ○ | ○ | ○ | ○ | ○ | ○ |
| Acid-resistance | ○ | ○ | ○ | ○ | ○ | ○ | ○ |
| Fastness against gasoline | ○ | ○ | ○ | ○ | ○ | ○ | ○ |
| Weather resistance | Better | Better | Better | Better | Better | Better | Better |
| Over-all appraisal | Better | Better | Better | Better | Better | Better | Better |
| Ratio of pigment/resin component (solid matter) | 0.03 | 0.16 | 0.04 | 0 | 0.80 | 0.80 | 0.80 |

Example

TABLE I-continued

| Items | | Example | | Comparison Example | | | | | |
|---|---|---|---|---|---|---|---|---|---|
| | | No. 29 | No. 30 | No. 1 | No. 2 | No. 3 | No. 4 | No. 5 | |
| Ratio of pigment/resin component (solid matter) | | 0.18 | 0.28 | 0.83 | 0.79 | 0.80 | 1.00 | 0.83 | |
| Starting Paint | Paint System | High solid cont.; 1 coat/1 bake solid color; (HIURETHAN No. 2000 HS White)* | High solid cont; 1 coat/1 bake solid color; (HIURETHAN No. 2000 HS Black)* | Soft; 1 coat/1 bake solid color; (PLA-Gloss No. 3000 Black)* | Soft; 1 coat/1 bake solid color; (PLA-Gloss No. 3000 Black)* | Soft; 1 coat/1 bake solid color; (PLA-Gloss No. 3000 Black)* | Soft; 1 coat/1 bake solid color; (PLA-Gloss No. 4000 White)* | Soft; 1 coat/1 bake solid color; (PLAGLOSS No. 4000 White)* | |
| Principal Resin System | | PEs/AI⁽⁷⁾ | PEs/AI⁽⁷⁾ | Soft AC/M⁽⁴⁾ | Soft AC/M⁽⁴⁾ | Soft AC/M⁽⁴⁾ | Soft PEs/AI⁽⁷⁾ | Soft PEs/AI⁽⁷⁾ resin | |
| N—Substituent Group R Formulated Finish Coating Composition | Composition (%) | Methyl | Methyl | n-Pentyl | Methyl | Methyl | — | Methyl | |
| | Resin Component (solid matter) | 27 | 68 | 30 | 30 | 30 | 30 | 30 | |
| | Pigment: | | | | | | | | |
| | Titanium dioxide | 62 | — | — | — | — | 24 | 24 | |
| | Carbon black | — | 2 | 1 | 1 | 1 | — | — | |
| | Electroconductive carbon black | — | — | — | — | — | — | — | |
| | Phthalocyanine Blue | — | — | — | — | — | — | — | |
| | Synthetic silica | — | — | — | — | — | — | — | |
| | Aluminum paste | — | — | — | — | — | — | — | |
| | Solvent: | | | | | | | | |
| | Pyrrolidone or its derivative | 5 | 15 | 20 | 3 | 45 | 20 | 20 | |
| | Xylene | — | 10 | 20 | 27 | 5 | — | 10 | |
| | Butyl acetate | — | — | — | — | — | — | — | |
| | n-Butyl alcohol | — | — | 8 | 8 | 8 | — | — | |
| | EGMEA⁽¹⁾ | 5 | 4 | 20 | 30 | — | 15 | 10 | |
| | Methyl ethyl ketone | — | — | — | — | 10 | 10 | 5 | |
| | Deionized water | — | — | — | — | — | — | — | |
| | Surface conditioner | 1 | 1 | 1 | 1 | 1 | 1 | 1 | |
| Result of Coating Test | Coating Viscosity (Ford Cup No. 4, 20° C.) | 30 sec. | 28 sec. | 20 sec. | 20 sec. | 20 sec. | 18 sec. | 18 sec. | |
| | Heat Drying Condition | 80° C., 45 min. | 120° C., 30 min. | 120° C., 30 min. | 120° C., 30 min. | 120° C., 30 min. | 80° C., 30 min. | 40° C., 10 hr. | |
| | Thickness of dried Coating Layer (μ) | 37 | 36 | 34 | 38 | ⁽¹¹⁾ | 36 | 38 | |
| | Adhesion | O | O | XX | XX | ⁽¹²⁾ | XX | XX | |
| | Acid-resistance | O | O | O | O | | O | O | |
| | Fastness against gasoline | O | O | Δ | X | | Δ | Δ | |
| | Weather resistance | O | O | O | O | | O | O | |
| Coating Layer | Over-all appraisal | Better | Better | ⁽¹³⁾ | ⁽¹³⁾ | ⁽¹⁴⁾ | ⁽¹³⁾ | ⁽¹³⁾ | |
| Ratio of pigment/resin component (solid matter) | | 2.30 | 0.03 | 0.03 | 0.03 | 0.03 | 0.80 | 0.80 | |

| Items | | Comparison Example | |
|---|---|---|---|
| | | No. 6 | No. 7 | No. 8 |
| Starting Paint | Paint System | Soft; 1 coat/1 bake solid color; (PLAGLOSS No. 4000 White)* | Lacquer; 1 coat/1 bake solid color; (ACRITE No. 500 White)* | A primer for coating synthetic resin; (PLAGLOSS No. 1100 Primer)* |
| Principal Resin System | | Soft PEs/AI⁽⁷⁾ resin | Acryl. resin/nitrocellulose | Polyurethane resin |
| N—Substituent Group R Formu- | Composition (%) | Methyl | Methyl | Methyl |

TABLE I-continued

| | | | | | |
|---|---|---|---|---|---|
| lated Finish | Resin Component (solid matter) | 30 | 20 | 16 | |
| | Pigment: | | | | |
| Coating Composition | Titanium dioxide | 24 | 18 | 8 | |
| | Carbon black | — | — | — | |
| | Electroconductive carbon black | — | — | — | |
| | Phthalocyanine Blue | — | — | — | |
| | Synthetic silica | — | — | — | |
| | Aluminum paste | — | — | — | |
| | Solvent: | | | | |
| | Pyrrolidone or its derivative | 20 | 30 | 30 | |
| | Xylene | 10 | 10 | 15 | |
| | Butyl acetate | — | — | — | |
| | n-Butyl alcohol | 10 | 11 | 10 | |
| | EGMEA(1) | 5 | 10 | 20 | |
| | Methyl ethyl ketone | — | — | — | |
| | Deionized water | — | — | — | |
| | Surface conditioner | 1 | 1 | 1 | |
| Coating Viscosity (Ford Cup No. 4, 20° C.) | | 18 sec. | 16 sec. | 14 sec. | |
| Heat Drying Condition | | 20° C., 240 hr. | 40° C., 1 hr. | 80° C., 30 min. | |
| Thickness of dried Coating Layer (μ) | | 38 | 32 | 20 | |
| Result of Coating Layer Test | Adhesion | XX | XX | O | |
| | Acid-resistance | O | O | Δ | |
| | Fastness against gasoline | X | X | X | |
| | Weather resistance | O | O | X | |
| | Over-all appraisal | O(13) | O(13) | X(15) | |
| Ratio of pigment/resin component (solid matter) | | 0.80 | 0.90 | 0.50 | |

Note:
*Trade mark of the firm Nippon Oil & Fats Co., Ltd.
(1)Ethylene glycol monoethylether acetate
(2)Base coat
(3)Top coat
(4)Acrylic resin/melamine resin
(5)Acrylic resin/aliphatic isocyanate
(6)Polyester resin/blocked isocyanate
(7)Polyester resin/aliphatic isocyanate
(8)Polyester resin/cycloaliphatic isocyanate
(9)Acrylic resin/cycloaliphatic isocyanate
(10)Polyester resin/melamine resin
(11)Flow occurs while drying
(12)No uniform coating layer formed
(13)Inferior in adhesion and in fastness to gasoline
(14)Defective coating
(15)Inferior in acid-resistance, fastness to gasoline and rate of luster retention

What is claimed is:

1. A method for finish coating a shaped, polyurethane article, which comprises:

coating directly on the surface of a polyurethane article which has not been coated with a primer, a first coating layer of a finish paint composition comprising a first film-forming paint component selected from the group consisting of (1) a single-liquid thermosetting paint comprising a polyester resin or an acrylic resin, in combination with a cross-linking component selected from the group consisting of an aminoplast, a blocked aliphatic isocyanate and a blocked cycloaliphatic isocyanate, (2) a two-liquid urethane paint comprising a polyester resin or an acrylic resin, in combination with a cross-linking component selected from the group consisting of an aliphatic isocyanate and a cycloaliphatic isocyanate, and (3) a lacquer paint made from an acrylic resin, nitrocellulose or cellulose acetate butyrate, said finish paint composition containing from 5 to 40% by weight of at least one compound having the formula

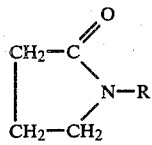

wherein R is hydrogen or alkyl having up to 4 carbon atoms;

then heating the coated polyurethane article at a temperature of at least 50° C., but lower than the thermal deformation temperature of the polyurethane article, to cure said coating layer.

2. A method according to claim 1, wherein said compound is at least one compound selected from the group consisting of 2-pyrrolidone, N-methyl-2-pyrrolidone, N-ethyl-2-pyrrolidone, N-propyl-2-pyrrolidone and N-butyl-2-pyrrolidone.

3. A method according to claim 1, wherein after said coating step and before said heating step, the coated polyurethane article is coated with a topcoat of a transparent or clear lacquer, both of said coating layer and said topcoat comprising an acrylic resin or a polyester resin, in combination with an aminoplast or isocyanate.

4. A method according to claim 3 in which said first coating layer has a high content of pigment and said topcoat is free of pigment or contains a low content of pigment.

5. A method according to claim 4 in which said first coating layer contains from 3 to 95% by weight of said first film-forming paint component and the weight ratio of pigment/film-forming paint component is up to 3/1.

6. A method according to claim 1 in which said first coating layer contains pigment and from 3 to 95% by weight of said first film-forming paint component and the weight ratio of pigment/film-forming paint component is up to 3/1.

7. A method according to claim 1 in which said finish paint composition contains from zero to 92% by weight, of solvent.

8. A method according to claim 1 in which said first coating layer is an external decorative coating which is superior in weather resistance, has a pleasing aesthetic appearance and is capable of dissolving in said component.

* * * * *